CODED SEQUENCE OF BEAM DISPLACEMENT

INVENTOR.
LORIMER CLAYTON, JR.
BY
Cushman, Darby & Cushman
ATTORNEYS

INVENTOR.
LORIMER CLAYTON, JR.

United States Patent Office 3,419,868
Patented Dec. 31, 1968

3,419,868
AUTOMATIC TRACKING SYSTEM UTILIZING CODED SCAN SEQUENCE
Lorimer Clayton, Jr., Atlanta, Ga., assignor to Scientific-Atlanta, Inc., Atlanta, Ga., a corporation of Georgia
Continuation of application Ser. No. 587,528, Oct. 18, 1966. This application Apr. 5, 1968, Ser. No. 719,265
16 Claims. (Cl. 343—113)

ABSTRACT OF THE DISCLOSURE

Disclosed in this application is an antenna tracking system in which the antenna beam is modulated as a measure of the deviation of the line-of-sight to the target from the boresight axis of the antenna in such a continually changing coded manner as to make that modulation distinguishable from other modulation, including extraneous signals, present on the incoming signal received by the antenna. The antenna beam is moved in accordance with a coded scan control signal which has a changing scanning pattern that is at least pseudo-randomly coded. That same coded control signal is correlated with the signal received by the antenna, to distinguish the deviation measuring signal in order that that signal only is employed to derive antenna pointing-error signals which are therefore free of the other modulation received by the antenna.

---

This is a continuation of application Ser. No. 587,528, filed Oct. 18, 1966, and now abandoned.

This invention relates to any tracking antenna system incorporating electronic means of scanning, switching, or lobing the antenna beam to impart a modulation to the signal received from the target, the modulation constituting a measure of the deviation of the line-of-sight to the target from the boresight axis of the antenna. In particular, the purpose of the invention is to make the modulation thus imparted distinguishable from other modulation present on the incoming signal received by the antenna, and to detect the scan-generated modulation only so as to derive antenna pointing-error signals that are not affected by such other modulation.

Tracking antenna systems can be classified broadly into the following categories:

(a) Mechanically scanning or lobing antenna systems, such as the widely used conical-scan type, which impart boresight-error modulation to the signal, employ a single-channel receiver, and derive pointing-error signals from the detected envelope of the modulated signal.

(b) "Monopulse" or "simultaneous lobing" systems which have a non-scanning antenna, employ a multiple-channel receiver to process the principal signal and one or two error signals provided by multiple ports of the antenna, and derive pointing-error signals by synchronous detection of the error-channel IF signals using the principal-channel IF signal as a reference.

(c) Electrically scanning or lobing antenna systems which impart a boresight-error modulation to the signal, employ a single-channel receiver, and derive pointing-error signals from the detected envelope of the modulated signal. Such a system may consist of an antenna of any of the types suitable for use in a monopulse system, an electronic scanning device, and a single-channel receiver of any of the types suitable for use in a conical-scan system. The electronic scanning device may incorporate means of switching, amplitude modulating, or phase shifting the signals from the antenna error ports and combining them with the principal signal so as to produce a composite signal similar to that produced by mechanical scanning or lobing.

Mechanically scanning antennas are subject to wear, require maintenance, and are normally limited to scan rates of 30/sec. or lower. Their most serious limitation in many applications is that the boresight-error modulation they produce is indistinguishable from modulation present upon the incoming signal due to multipath propagation interference phenomena, spinning or other motion of the target, or intentional jamming. Such modulation having frequency components near the scan rate causes spurious pointing-error signals which result in degraded performance or loss of track.

Monopulse systems overcome these difficulties, but the required multi-channel receiver is complex and expensive, and is difficult to adjust and maintain because of the necessity for precise phase stability and automatic-gain-control tracking among channels.

Electrically scanning systems overcome the mechanical disadvantages of scanning antennas while retaining the simplicity of a single-channel receiver. They suffer the same limitation of sensitivity to spurious modulation. Their performance is generally superior to that of mechanical systems, however, because the scan rate can be made high compared to the predominant frequencies encountered from spin modulation and multipath effects. Nevertheless, the scan rate is often required to be lower than information-bearing modulation frequencies present in the signal, and the complex periodic modulation produced by target spin can have significant harmonic content in the region of a few hundred hertz. Even when not so severe as to cause loss of track, beat phenomena cause cyclic tracking errors.

The primary object of this invention is to provide a scanning pattern which is coded, and thus provides coding of the error-signal modulation to make it non-coherently related to modulation which might be present on the incoming signal.

A brief description of an illustrative embodiment of this invention will now be given. The automatic tracking antenna can be any antenna using electronic means for generating an amplitude-modulated RF signal whose amplitude modulation is related to the off-boresight angle. The RF signal is normally (but not necessarily) amplified and detected by an AM receiver. The detected signal is in an AC form, containing error signals correlated with the coded scan drive signal, and also containing other signals corresponding to the amplitude modulation on the incoming RF signal. The AC error signal is converted to a DC error signal in a cross-correlation detector which uses as reference the scan drive signal. The detector will be non-responsive to signals other than those that have significant correlation with the scan drive signal.

One illustrative embodiment of this invention employs a scan drive signal which directs the beam successively to various discrete pointing angles symmetrically disposed about the boresight axis. In the case of a four-position scan pattern, one might visualize the positions as displaced "up," "down," "right," and "left" from the boresight axis. The sequence of steps from one direction to another would be made to follow a pseudo-random code chosen to have minimum correlation with any single-frequency modulation component.

Thus, a further object of this is to make an electrically scanning tracking antenna system almost completely immune to disturbance from amplitude modulation of the incoming signal, without substantial increase in cost or complexity.

A further object of this invention is the use of a coded scan sequence in an automatic tracking system, in combination with a pointing-error detector that is non-responsive to signals other than those that have significant correlation with the scan drive signal.

Reference should also be made to an application by P. M. Pifer entitled, "Automatic Tracking System Utilizing Coded Scan Rate," Ser. No. 707,335, filed on Apr. 5, 1968 and which is a continuation of application Ser. No. 587,608, filed on Oct. 18, 1966, now abandoned.

Other objects and advantages of this invention will become apparent upon reading the appended claims in conjunction with the following detailed description and the attached drawings, in which:

Figure 1:
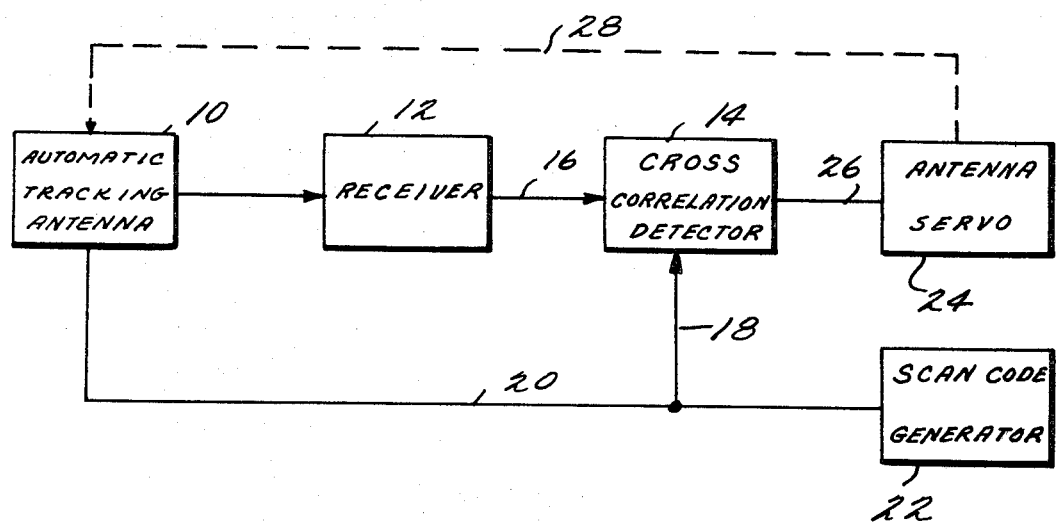
FIGURE 1 is a block diagram of an illustrative embodiment of the invention.

Referring to FIGURE 1 there is shown an overall block diagram of the system. The tracking antenna is indicated as 10, the amplitude modulated radio frequency signal being received by this antenna.

The received signal is applied to receiver 12 where the modulation is detected and applied to cross-correlation detector 14 via line 16. Also applied to cross-correlation detector 14 over line 18 is a coded signal from scan code generator 22. The coded signal is also applied over line 20 to vary the direction of the antenna beam in a pseudo-random manner as will be described in more detail hereinafter.

A direct current error signal is applied to antenna servomechanism 24 over line 26. The magnitude of this error signal depends ideally only on the deviation of the line-of-sight to the target from the boresight axis of the antenna 10. The error signal on line 26 may control servomechanism 24 so that the deviation of the target from the boresight axis is minimized by appropriate means as indicated at 28.

Figure 2:
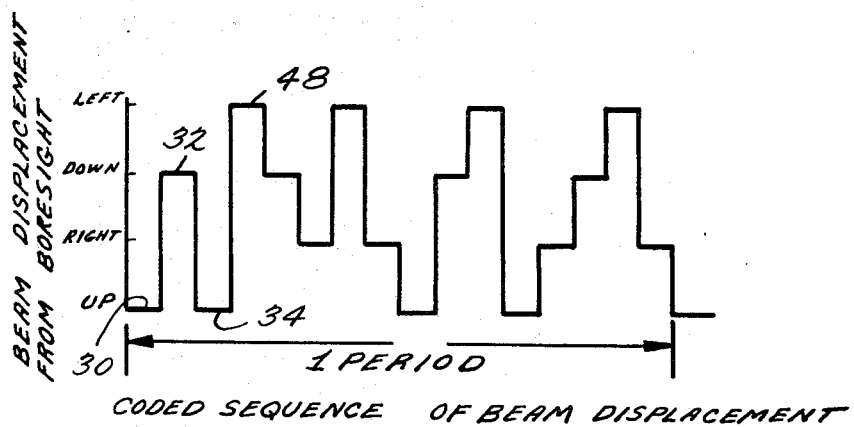
FIGURE 2 is a typical coded reference waveform employed in the illustrative embodiment.

Having now described in general terms the structure required for the accomplishment of the objects of this invention, a description of the operation thereof will now be given. Reference should be made to FIGURE 2 which graphically illustrates the correspondence between the beam displacement from the boresight axis and the signal output from code generator 22. Thus in the first portion 30 of the signal the displacement of the beam is in the direction visualized as "up," at the second portion 32 of the signal the displacement is "down," whereas at the third portion 34 of the signal the beam displacement is "up." Thus, the beam scan follows a complex pattern as the signal from code generator 22 changes with time. As indicated in FIGURE 2, the output of generator 22 is periodic. In light of this periodicity, this signal is pseudo-random as opposed to purely random. However, it would, of course, be within the scope of one having ordinary skill in this art to employ a pure random signal generator for scan code generator 22 rather than the pseudo-random generator which is described in this embodiment of the invention.

The output signal from code generator 22 thus corresponds to the signal shown in FIGURE 2. This signal is applied to automatic tracking antenna 10 to change the beam orientation thereof with respect to time. By thus changing the orientation an amplitude modulation is imparted to the signal received from the target, the modulation constituting a measure of the deviation of the line-of-sight to the target from the boresight axis of the antenna. As stated hereinbefore, various extraneous sources introduce further modulation into the received signal thereby impairing the accuracy of the deviation measurement. However, due to the pseudo-random nature of the modulation imparted to the received signal by scan code generator 22, there is very little or no correspondence between the waveforms of the imparted modulation and the modulation due to the extraneous sources. Although not specifically shown, various means are readily available to those having ordinary skill in this art for converting the various amplitudes of the pseudo-random signal to the corresponding beam orientations shown in FIGURE 2.

The amplitude demodulated signal on line 16 contains components due to (1) the modulation imparted by code generator 22 which corresponds to the desired deviation measurement and (2) the various erroneous signals introduced by different sources extraneous to the tracking system. The output of cross-correlation detector line 26 is maximized when the wave shapes on lines 16 and 18 are identical; whereas, the greater the deviation in the wave shape of the signal on line 16 from the wave shape of the signal on line 18, the smaller the amplitude of the signal on line 26. Thus, the components of the demodulated signal on line 16 corresponding to the imparted modulation will result in a maximized direct current error signal on line 26 whereas the components of the demodulated signal on line 16 due to the various extraneous sources will cause minimal, if any, output on line 26 due to the non-correlation in wave shape of these extraneous signals to the wave shape of the coded signal on line 18. The optimum wave shape of the signal on line 18 may be determined by making a statistical study of the expected wave shapes of the various possible extraneous sources and then choosing the wave shape of the coded signal on line 18 to correlate as little as possible with the expected wave shapes of the extraneous sources.

Although the foregoing invention has been described in terms of changing the beam orientation in an automatic tracking system, it should be understood that generally speaking the invention applies to all instances wherein a coded amplitude modulation is placed on the signal received by the antenna of electrically scanning automatic tracking systems.

Figure 3:
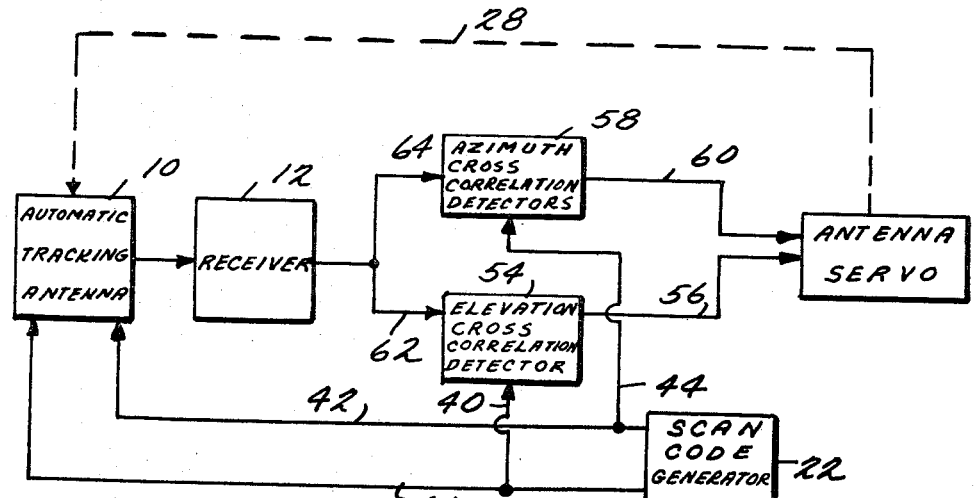
FIGURE 3 is a block diagram of a preferred embodiment of the invention.
Figure 4:
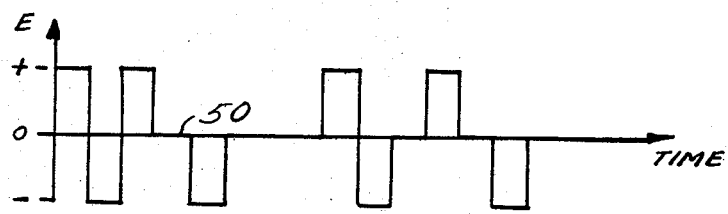
FIGURES 4 and 5 are coded reference waveforms used in the embodiment shown in FIGURE 3.
Figure 5:
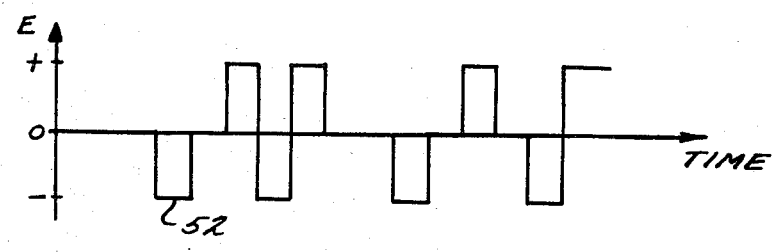

The embodiment of the invention described in FIGURE 1 may be implemented in several ways. For instance, the 4-level signal corresponding to the waveform shown in FIGURE 2 may be applied directly to the antenna 10 and the cross-correlation detector 14, as shown in FIGURE 1, with both the antenna and the detector suitably constructed to respond to 4-level signals. However, in a preferred embodiment of the invention as shown in FIGURE 3, a pair of cross-correlation detectors 54 and 58 respectively respond to 3-level signals as shown in FIGURES 4 and 5, such cross-correlation detectors being well known to those having ordinary skill in this art. The waveform of FIGURE 4 occurs on lines 40 and 46 and the waveform shown in FIGURE 5 occurs on lines 42 and 44. The waveform shown in FIGURE 4 corresponds to the reference signal for cross-correlation detection of the elevation component of the pointing error signal applied to detector 54 over line 40 while the waveform shown in FIGURE 5 corresponds to the reference signal for cross-correlation detection of the azimth component of the pointing error signal applied to detector 58 over line 44.

The reference signals shown in FIGURES 4 and 5 correspond to the displacement sequence of the antenna beam shown in FIGURE 2. Thus, the reference signal corresponding to the elevation component as shown in FIGURE 4 has a positive value with respect to the zero reference when the beam displacement is up as indicated at 30 in FIGURE 2. The elevation component reference signal next has a negative value corresponding to the down displacement of the beam as indicated at 32 in FIGURE 2. Further, the reference signal for the elevation component is not displaced from the zero reference whenever the beam displacement is in the azimuth plane, that is, left or right. Hence, when the beam displacement is left, as indicated at 48 in FIGURE 2, the elevation component reference signal will have a zero value as indicated at 50 in FIGURE 4. However, at the same time, the azimuth component reference signal of FIGURE 5 will have a negative value with respect to the zero reference as indicated at 52. Thus, whenever the beam displacement occurs in the azimuth plane, the elevation component reference signal has a zero value and whenever the displacement is in the elevation plane, the azimuth component reference signal has a zero value.

The elevation component reference signal on line 40 is applied to cross-correlation detector 54 to derive the elevation component of the error signal on line 56 which is, in turn, applied to antenna servo 24 for the operation thereof in the manner described hereinbefore. The azimuth component reference signal on line 44 is applied to azimuth cross-correlation detector 58 and the azimuth component of the pointing error signal is derived on line 60 and also applied to antenna servo 24.

Thus there has now been described apparatus for accomplishing the objects of this invention. There will, of course, occur to those having ordinary skill in this art various means for accomplishing the basic purpose of this invention—that is, the reducing of the effect of various extraneous signals on an amplitude modulated signal received from a target in a tracking system which includes means for scanning, switching, or lobing an antenna beam in a coded manner and thereby coding the modulation which is imparted to the received signal and which is a deviation measurement of the line-of-sight to the target from the boresight axis of the antenna.

The waveform as shown in FIGURE 2 is desirable because of the number of steps or increments per period—that is, the maximum correlation of a well chosen code with any single-frequency extraneous modulation component is inversely proportional to the square root of the length of the code. Thus, the use of 16 steps for a period as opposed to, say, 4 steps improves the ability of the code to reject extraneous modulation components. The chosen length of the code will vary depending on the type of extraneous modulation component expected.

Since the code chosen in FIGURES 2, 4, and 5 is pseudo-random (that is, periodic), the particular code employed must be chosen with discretion to avoid inadvertent large correlation with a particular harmonic of the period. A well chosen code has its spectral content spread as uniformly as possible over all harmonics. As can be readily proven, the spectra of both of the waveforms illustrated in FIGURES 4 and 5 are identical. Further, it can be shown that the spectra of both of these waveforms are reasonably spread out. Thus, they would be well suited for rejection of extraneous modulation components.

Various modifications of the invention would become apparent to one of ordinary skill in the art upon reading the foregoing disclosure. During such a reading, it would be evident that this invention provides unique apparatus for accomplishing the objectives and advantages herein stated. It is to be understood, however, that the foregoing disclosure is to be considered exemplary and not limitative, the scope of the invention being defined by the following claims.

I claim:

1. Apparatus for reducing the effects of various extraneous modulation of a signal received from a target in tracking systems of the type which scan, switch or lobe the effective directivity of an antenna and thereby impart deviation modulation to the signal received from the target which is a measurement of the deviation of the line-of-sight to the target from the boresight axis of the antenna, said apparatus comprising:
    means including antenna means for receiving said signal and imparting said deviation modulation,
    means for imparting to said deviation modulation a code which is at least pseudo-random,
    and detector means responsive to both the coded modulation on said received signal and to said code for developing said deviation measurement with a maximized correspondence to the coded deviation modulation due to the correlation of said code and said coded deviation modulation and to minimize the said effects of various extraneous modulation due to noncorrelation with said code.

2. Apparatus for reducing the effects of various extraneous modulation of a signal received from a target in tracking systems of the type which scan, switch or lobe the direction of maximum sensitivity of an antenna and thereby impart deviation modulation to the signal received from the target which is a measurement of the deviation of the line-of-sight to the target from the boresight axis of the antenna, said apparatus comprising:
    antenna means for receiving said signal and imparting said off-boresight deviation modulation including means for moving the direction of maximum sensitivity of said antenna means,
    means for varying said direction of maximum sensitivity in accordance with a signal representing a code which is at least pseudo-random,
    and detector means responsive to both the coded modulation on said received signal and to a signal representing said code for developing said deviation measurement with a maximized correspondence to the coded deviation modulation due to the correlation of the said code signal and said coded deviation modulation and to minimize said effects of various extraneous modulation due to noncorrelation with said code signal.

3. Apparatus as set forth in claim 2 wherein said developing and varying means causes the amplitude of said code signal to vary at least pseudo-randomly and to change the maximum sensitivity direction of said antenna means in accordance with the amplitude variations in said code signal.

4. Apparatus as set forth in claim 2 wherein said code signal developing means causes the code signal to be random.

5. Apparatus as in claim 2 and including antenna servo-means responsive to said deviation measurement for causing said antenna means to track said target.

6. Apparatus as in claim 2 wherein said imparted deviation is amplitude modulation.

7. Apparatus for use with a tracking antenna system which incorporates electronic means for scanning, switching or lobing the effective pointing direction of an antenna to impart a modulation to the signal received from the target, the modulation constituting a deviation measurement of the line-of-sight to the target from the boresight axis of the antenna, the purpose of the said apparatus being to make the modulation thus imparted distinguishable from other modulation present on the incoming signal received by the antenna, the apparatus comprising:
    antenna means for receiving the modulated signal, the effective pointing direction of the antenna means being spatially positioned successively in various discrete pointing angles about said boresight axis in response to a coded scan control signal applied thereto;
    means for generating said control signal with a changing scanning pattern that is at least pseudo-randomly coded and applying said control signal to said antenna means, to scan said beam accordingly, thereby imparting said modulation to said received signal; and
    correlating means responsive to said received signal and said coded control signal for detecting only the said scan-generated modulation and thereby deriving an antenna pointing-error signal that is not affected by said other modulation.

8. Apparatus, as in claim 6, where said coded control signal generating means includes means for varying said coded signal randomly.

9. Apparatus, as in claim 6, where said means for detecting the scan-generated modulation includes a cross-correlation detector.

10. Apparatus, as in claim 6, where said control signal generating means includes:
    means for generating at least a second control signal with a changing scanning pattern that is coded compatibly with the first-mentioned control signal, one of said control signals corresponding to displacement of the antenna beam along a first coordinate of the tracking system and another of said control signals corresponding to displacement of said antenna beam along a second coordinate of said tracking system; and said detecting means being responsive to both of said control signals and said received signal for deriving at least two antenna pointing-error signals which respectively correspond to said first and second coordinates.

11. Apparatus, as in claim 10, where said first and second coordinates are azimuth and elevation, respectively.

12. Apparatus for reducing the effects of various extraneous modulation of a signal received from a target in a tracking system which includes means for scanning, switching or lobing an antenna beam and thereby imparting to said signal further modulation which is a deviation measurement of the line-of-sight to the target from the boresight axis of the antenna, said apparatus comprising:

antenna means for receiving said signal, the beam of said antenna means being moved in accordance with a coded scan control signal applied thereto;

means for generating said coded scan control signal with a changing scanning pattern that is at least pseudo-randomly coded and applying said control signal to said antenna means to scan said beam accordingly, thereby imparting said modulation to said received signal which is a function of said coded control signal; and means responsive to the modulation on said received signal and to said coded control signal for maximizing said deviation measurement because of correlation of the said imparted modulation and the coded control signal and for minimizing the said effects of various extraneous signals because of non-correlation of the coded control signal and said extraneous signals.

13. Apparatus, as in claim 1, where the movement of the beam of said antenna means varies in accordance with the amplitude of said coded control.

14. Apparatus, as in claim 2, where said coded control signal generating means includes means for varying said coded signal randomly.

15. Apparatus, as in claim 2, where said apparatus includes means for detecting said amplitude modulated signal to provide an alternating current signal and where said means for providing the deviation measurement includes a cross-correlation detector.

16. Apparatus, as in claim 4, including means responsive to said deviation measurement for reducing said deviation.

References Cited

UNITED STATES PATENTS

| | | | |
|---|---|---|---|
| 2,969,541 | 1/1961 | Seaman | 343—120 |
| 3,041,605 | 6/1962 | Goodwin et al. | |

RICHARD A. FARLEY, *Primary Examiner.*

R. E. BERGER, *Assistant Examiner.*

U.S. Cl. X.R.

343—16, 100, 117, 120

Disclaimer 3,419,868.—*Lorimer Clayton, Jr.*, Atlanta, Ga. AUTOMATIC TRACKING SYSTEM UTILIZING CODED SCAN SEQUENCE. Patent dated Dec. 31, 1968. Disclaimer filed Aug. 18, 1975, by the assignee, *Scientific-Atlanta, Inc.*

Hereby disclaims the entire term of said patent.

[*Official Gazette November 11, 1975.*]